United States Patent
Kao et al.

(10) Patent No.: US 6,583,234 B2
(45) Date of Patent: Jun. 24, 2003

(54) PROCESS FOR PREPARING WATERFASTNESS ADDITIVE

(75) Inventors: Sheau V. Kao, Oakville (CA); Daniel A. Foucher, Toronto (CA); Mohammad J. Hossain, Toronto (CA); Christine E. Bedford, North York (CA); George Liebermann, Mississauga (CA)

(73) Assignee: Xerox Corporation, Stamford, CT (US)

( * ) Notice: Subject to any disclaimer, the term of this patent is extended or adjusted under 35 U.S.C. 154(b) by 181 days.

(21) Appl. No.: 09/915,430

(22) Filed: Jul. 26, 2001

(65) Prior Publication Data

US 2003/0027948 A1 Feb. 6, 2003

(51) Int. Cl.$^7$ .............................. C08F 2/04; C09D 11/02
(52) U.S. Cl. ........................ 526/75; 526/67; 526/227; 526/229; 526/295; 523/161; 564/295; 564/296; 106/31.27; 106/31.49
(58) Field of Search ................ 523/161; 526/67, 526/75, 227, 229, 295; 564/295, 296; 106/31.27, 31.49

(56) References Cited

U.S. PATENT DOCUMENTS

| | | | | |
|---|---|---|---|---|
| 3,461,163 A | * | 8/1969 | Boothe ................. | 564/296 X |
| 6,001,899 A | | 12/1999 | Gundlach et al. ........... | 523/160 |
| 6,054,505 A | | 4/2000 | Gundlach et al. ........... | 523/160 |
| 6,174,355 B1 | | 1/2001 | Mayo et al. ............ | 106/31.43 |
| 6,258,873 B1 | | 7/2001 | Gundlach et al. ........... | 523/160 |
| 2002/0147251 A1 | * | 10/2002 | Ohta et al. ................. | 523/161 |
| 2002/0177633 A1 | * | 11/2002 | Komatsu et al. ............ | 523/160 |

OTHER PUBLICATIONS

Gundlach et al., "Improved Washing Composition For Indelible Marks," Co–Pending application Ser. No. 09/405,680, filed Sep. 24, 1999.
K.A. Krause, "Focusing Ink Jet Head," *IBM Technical Disclosure Bulletin*, vol. 16, No. 4, Sep. 1973, pp. 1168–1170.

* cited by examiner

*Primary Examiner*—Fred Teskin
(74) *Attorney, Agent, or Firm*—Judith L. Byorick

(57) ABSTRACT

Disclosed is a process which comprises (a) reacting allyl bromide with diethyl amine in a molar ratio of at least about 1 mole of allyl bromide per about 1.15 moles of diethyl amine and in a molar ratio of no more than about 1 mole of allyl bromide per about 2 moles of diethyl amine, thereby generating allyl diethyl amine in a monomer reaction mixture; (b) subsequently filtering the monomer reaction mixture to remove impurities; (c) subsequently reacting the allyl diethyl amine with allyl bromide, thereby generating solid diallyl diethyl ammonium bromide; (d) subsequently isolating the solid diallyl diethyl ammonium bromide; (e) subsequently dissolving the diallyl diethyl ammonium bromide in a solvent and adding thereto a polymerization initiator to form a polymerization reaction mixture; (f) subsequently heating the polymerization reaction mixture in a vessel equipped with a reflux condenser to a temperature of from about 90 to about 100° C., thereby generating poly(diallyl diethyl ammonium bromide); and (g) subsequently optionally isolating the poly(diallyl diethyl ammonium bromide) from the polymerization reaction mixture.

20 Claims, No Drawings

PROCESS FOR PREPARING WATERFASTNESS ADDITIVE

Copending application U.S. Ser. No. 09/405,680, filed Sep. 24, 1999, entitled "Improved Washing Composition for Indelible Marks," with the named inventors Kurt B. Gundlach and Richard L. Colt, the disclosure of which is totally incorporated herein by reference, discloses a washing composition which comprises a linear alkyl diphenyl oxide disulfonate compound, a chloride, bromide, iodide, nitrate, acetylacetonate, polyphosphate, squarate, or sulfonate salt or mixtures thereof, and a cosolvent which is propylene glycol, dipropylene glycol, tripropylene glycol, diethylene glycol, glycerine, trimethylolethane, trimethylolpropane, or mixtures thereof.

BACKGROUND OF THE INVENTION

The present invention is directed to processes for preparing compositions suitable for use as waterfastness additives in inks. More specifically, the present invention is directed to processes for preparing diallyl diethyl ammonium bromide and poly(diallyldiethylammonium bromide). One embodiment of the present invention is directed to a process which comprises (a) reacting allyl bromide with diethyl amine in a molar ratio of at least about 1 mole of allyl bromide per about 1.15 moles of diethyl amine and in a molar ratio of no more than about 1 mole of allyl bromide per about 2 moles of diethyl amine, thereby generating allyl diethyl amine in a monomer reaction mixture, (b) subsequently filtering the monomer reaction mixture to remove impurities; (c) subsequently reacting the allyl diethyl amine with allyl bromide, thereby generating solid diallyl diethyl ammonium bromide; (d) subsequently isolating the solid diallyl diethyl ammonium bromide; (e) subsequently dissolving the diallyl diethyl ammonium bromide in a solvent and adding thereto a polymerization initiator to form a polymerization reaction mixture; (f) subsequently heating the polymerization reaction mixture in a vessel equipped with a reflux condenser to a temperature of from about 90 to about 100° C., thereby generating poly(diallyl diethyl ammonium bromide); and (g) subsequently optionally isolating the poly(diallyl diethyl ammonium bromide) from the polymerization reaction mixture.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop-on-demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697, 195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

U.S. Pat. No. 6,258,873 (Gundlach et al.), the disclosure of which is totally incorporated herein by reference, discloses an ink composition which comprises water, an acid dye, a monovalent salt, a polyquaternary amine compound, and an optional nonionic or cationic surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

U.S. Pat. No. 6,174,355 (Mayo et al.), the disclosure of which is totally incorporated herein by reference, discloses an ink composition comprising a colorant and poly(diallyl diethyl ammonium) bromide. Also disclosed are ink jet printing processes, including thermal ink jet and acoustic ink jet printing processes, for using the inks.

U.S. Pat. No. 6,001,899 (Gundlach et al.), the disclosure of which is totally incorporated herein by reference, discloses an ink composition which comprises water, an anionic dye, and a polyquaternary amine compound selected from the group consisting of polydiallyl ammonium compounds, polyquaternized polyvinylamines, polyquaternized polyallylamines, and mixtures thereof. Also disclosed are methods for using the aforementioned ink composition in ink jet printing processes.

U.S. Pat. No. 6,054,505 (Gundlach et al.), the disclosure of which is totally incorporated herein by reference, discloses an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water, (2) a nonpolymeric salt comprising at least one cation and at least one anion; (3) an anionic dye; and (4) a polyquaternary amine compound. In one embodiment, the polyquaternary amine compound is selected from the group consisting of polydiallyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

While known compositions and processes are suitable for their intended purposes, a need remains for waterfast ink compositions. In addition, a need remains for improved methods for preparing polymeric compositions that enhance the waterfastness of inks. Further, a need remains for improved methods for preparing monomeric precursors to polymeric compositions that enhance the waterfastness of inks. Additionally, a need remains for improved methods for preparing poly(diallyl diethyl ammonium bromide). There is also a need for improved methods for preparing monomeric diallyl diethyl ammonium bromide. In addition, there is a need for methods for preparing diallyl diethyl ammonium bromide that enable improved purity of the product and reduced amounts of undesirable byproducts. Further, there is a need for methods for preparing diallyl diethyl ammonium bromide that enable simplified product isolation processes. Additionally, there is a need for methods for preparing poly(diallyl diethyl ammonium bromide) that are less time-consuming than known processes.

SUMMARY OF THE INVENTION

The present invention is directed to a process which comprises (a) reacting allyl bromide with diethyl amine in a molar ratio of at least about 1 mole of allyl bromide per about 1.15 moles of diethyl amine and in a molar ratio of no more than about 1 mole of allyl bromide per about 2 moles of diethyl amine, thereby generating allyl diethyl amine in a monomer reaction mixture; (b) subsequently filtering the monomer reaction mixture to remove impurities; (c) subsequently reacting the allyl diethyl amine with allyl bromide, thereby generating solid diallyl diethyl ammonium bromide; (d) subsequently isolating the solid diallyl diethyl ammonium bromide; (e) subsequently dissolving the diallyl diethyl ammonium bromide in a solvent and adding thereto a polymerization initiator to form a polymerization reaction mixture; (f) subsequently heating the polymerization reaction mixture in a vessel equipped with a reflux condenser to a temperature of from about 90 to about 100° C., thereby generating poly(diallyl diethyl ammonium bromide); and (g) subsequently optionally isolating the poly(diallyl diethyl ammonium bromide) from the polymerization reaction mixture.

DETAILED DESCRIPTION OF THE INVENTION

In the process of the present invention, allyl diethyl ammonium bromide is prepared by reacting allyl bromide and diethyl amine in a specific molar ratio, typically of at least about 1 mole of allyl bromide per about 1.15 moles of diethyl amine, and preferably of at least about 1 mole of allyl bromide per about 1.19 moles of diethyl amine, and typically no more than about 1 mole of allyl bromide per about 2 moles of diethyl amine, although the molar ratio can be outside of this range. In one specific embodiment, the molar ratio is about 1 mole of allyl bromide per about 2 moles of diethyl amine.

While not required, since the two reactants are both liquids and the product is a solid that will come out of solution, the reaction between allyl bromide and diethyl amine typically occurs in a solvent. Examples of suitable solvents include acetone, ethers (including but not limited to diethyl ether, substituted ethers, and the like), alkyl ketones (including but not limited to dimethyl ketone and the like), and the like, as well as mixtures thereof. Typical amounts of solvent are from about 0.5 to about 2 parts by weight solvent per 1 part by weight allyl bromide, preferably from about 0.7 to about 1.8 parts by weight solvent per 1 part by weight allyl bromide, and more preferably from about 0.9 to about 1.6 parts by weight solvent per 1 part by weight allyl bromide, although the amount of solvent can be outside of these ranges.

The reaction between the allyl bromide and the diethyl amine can take place at any desired or suitable temperature, typically at least about 20° C., preferably at least about 25° C., and more preferably at least about 30° C., and typically no more than about 40° C., and preferably no more than about 35° C., although the reaction temperature can be outside of these ranges.

In one specific embodiment, the allyl bromide is added slowly into a mixture of diethyl amine and an optional solvent. This method prevents excessive heat generation during the course of the reaction and helps the reaction to proceed at the desired temperature. Typically, following the completion of the allyl bromide addition, the reaction is allowed to proceed for an additional period of from about 1 to about 2 hours to ensure that the reaction has gone to completion.

Thereafter, the reaction mixture is filtered to purify the product, allyl diethyl amine, which remains dissolved in the solvent if a solvent is employed. While no additional purification processes other than filtration are required to obtain desirably pure allyl diethyl amine, any other desired methods can also be used.

While not required, since the two reactants are both liquids and the product is a solid that will come out of solution, the product allyl diethyl amine can then optionally be redissolved in a solvent for subsequent reaction with additional allyl bromide. Examples of suitable solvents include acetone, ethers (including but not limited to diethyl ether, substituted ethers, and the like), alkyl ketones (including but not limited to dimethyl ketone and the like), and the like, as well as mixtures thereof. The solvent selected can be either the same as or different from any optional solvent selected for the reaction between allyl bromide and diethyl amine. Typical amounts of solvent are from about 0.8 to about 2 parts by weight solvent per 1 part by weight allyl diethyl amine, preferably from about 0.9 to about 1.5 parts by weight solvent per 1 part by weight allyl diethyl amine, and more preferably from about 1 to about 1 parts by weight solvent per 1 part by weight allyl diethyl amine, although the amount of solvent can be outside of these ranges. Alternatively, subsequent to filtration, the filtrate can be used as is for the subsequent reaction.

The allyl diethyl amine is subsequently reacted with additional allyl bromide, typically in a molar ratio of at least about 1 mole of allyl bromide per about 0.9 moles of allyl diethyl amine, and typically in a molar ratio of no more than about 1 mole of allyl bromide per about 1.1 moles of allyl diethyl amine, although the molar ratio can be outside of these ranges. In one specific embodiment, the molar ratio is about 1 mole of allyl bromide per about 1 mole of allyl diethyl amine.

The reaction between the allyl bromide and the allyl diethyl amine can take place at any desired or suitable temperature, typically at least about 20° C., preferably at least about 25° C., and more preferably at least about 30° C., and typically no more than about 40° C., and preferably no more than about 35° C., although the reaction temperature can be outside of these ranges.

In one specific embodiment, the allyl bromide is added slowly into a mixture of allyl diethyl amine and an optional solvent. This method prevents excessive heat generation during the course of the reaction and helps the reaction to proceed at the desired temperature. Typically, following the completion of the allyl bromide addition, the reaction is allowed to proceed for an additional period of from about 1 to about 2 hours to ensure that the reaction has gone to completion.

The resulting product, diallyl diethyl ammonium bromide, appears as a precipitate of crystals in the reaction mixture. The product is isolated by any desired or suitable method, such as filtration followed by washing, or the like.

Polymerization of the diallyl diethyl ammonium bromide then takes place as follows. The diallyl diethyl ammonium bromide monomer is added to a solvent. Any desired or suitable solvent can be employed. Examples of suitable solvents include those that dissolve the monomeric material, do not react with the selected polymerization initiator, and have boiling points of about 100° C. or higher, such as water, acetonitrile, sulfolane, n-methylpyrrolidone, pyridine, and the like, as well as derivatives and mixtures thereof. The diallyl diethyl ammonium bromide and the solvent are present in any desired or effective relative amounts, typically from about 0.25 to about 1 part by weight solvent per every one part by weight diallyl diethyl ammonium bromide, preferably from about 0.25 to about 0.75 part by weight solvent per every one part by weight diallyl diethyl ammonium bromide, and more preferably from about 0.25 to about 0.5 part by weight solvent per every one part by weight diallyl diethyl ammonium bromide, although the amount of solvent can be outside of these ranges.

To the reaction mixture is also added a polymerization initiator suitable to effect polymerization of diallyl diethyl ammonium bromide to poly(diallyl diethyl ammonium bromide). Examples of suitable initiators include water soluble peroxides, including (but not limited to) t-butylhydroperoxide, hydrogen peroxide, ammonium persulfate, and the like, as well as mixtures thereof. The initiator is present in any desired or effective amount, typically a relatively large amount because the reaction tends to be endothermic and slow to start. In addition, in some instances, much of the initiator can be lost or hydrolyzed when the reaction mixture is heated. Further, in embodiments in which low molecular weight polymers are desired, relatively large amounts of initiator help ensure that the molecular weights do not get too high. The amount of initiator is typically from about 5 to about 40 parts by weight of initiator per every 100 parts by weight of diallyl diethyl ammonium bromide, preferably from about 10 to about 30 parts by weight of initiator per every 100 parts by weight of diallyl diethyl ammonium bromide, and more preferably from about 10 to about 25 parts by weight of initiator per every 100 parts by weight of diallyl diethyl ammonium bromide, although the relative amounts of initiator and monomer can be outside of these ranges.

The reaction vessel is then equipped with a reflux condenser and brought to an elevated temperature, typically at least about 90° C., preferably at least about 95° C., and more preferably at least about 98° C., and typically no more than about 100° C., although the temperature can be outside of these ranges.

While not required, the reflux condenser preferably has a heat transfer area of at least about 0.9 square meters for every kilogram of polymerization initiator, and preferably has a heat transfer area of no more than about 1.5 square meters for every kilogram of polymerization initiator, more preferably no more than about 1.2 square meters for every kilogram of polymerization initiator, and even more preferably no more than about 1 square meter for every kilogram of polymerization initiator, although the heat transfer area can be outside of these ranges.

Reaction times are typically at least about 400 minutes, and typically no more than about 500 minutes, preferably no more than about 450 minutes, and even more preferably no more than about 420 minutes, although the reaction time can be outside of these ranges.

Subsequent to completion of the reaction, if desired, an alcohol, such as methanol, isopropanol, t-butanol, or the like, can be added to the reaction mixture to quench any unreacted initiator and to render the polymer product more easily precipitated. When added, the alcohol is added in an amount typically of about 1 part by weight alcohol per every 1 part by weight solvent in the reaction mixture, although the relative amounts of alcohol and solvent can be outside of this range.

Thereafter, the poly(diallyl diethyl ammonium bromide) is precipitated from the reaction mixture by admixture of the reaction mixture with a suitable precipitant. Examples of suitable precipitants include mixtures of alcohols (such as methanol, ethanol, isopropanol, butanol, or the like) and ethers (such as diethyl ether, methyl ethyl ether, or the like), with one specific example including a mixture of methanol and diethyl ether, ketones, such as acetone and methyl ethyl ketone, and the like, as well as mixtures thereof. The solid polymer product is then recovered by any desired or suitable method, such as filtration or the like.

The resulting poly(diallyl diethyl ammonium bromide) can then be added to an aqueous ink composition as, for example, a waterfastness-enhancing additive. The poly (diallyl diethyl ammonium bromide) is present in the ink in any desired or effective amount, typically at least about 0.5 percent by weight of the ink, and preferably at least about 1 percent by weight of the ink, and typically no more than about 10 percent by weight of the ink, and preferably no more than about 5 percent by weight of the ink, although the amount can be outside of these ranges.

The inks of the present invention contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether (such as DOWANOL® TPM), ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The inks of the present invention also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles, Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam, Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regale 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

Other optional additives to the inks include biocides such as DOWICIL® 150, 200, and 75, benzoate salts, sorbate salts, PROXEL® GXL and BD20, available from Zeneca, PARADYME®, available from Zeneca, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range.

Ink compositions of the present invention can be of any suitable or desired pH. For some embodiments, such as thermal ink jet printing processes, typical pH values are from about 3 to about 11, preferably from about 5 to about 10, and more preferably from about 6 to about 9, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink of the present invention into an ink jet printing apparatus and causing droplets of the inks to be ejected in an imagewise pattern onto a recording substrate. In one specific embodiment, the printing apparatus employs a thermal ink jet process wherein the ink in the nozzles is selectively heated in an imagewise pattern, thereby causing droplets of the ink to be ejected in imagewise pattern. In another specific embodiment, the printing apparatus employs an acoustic ink jet process, wherein droplets of the ink are caused to be ejected in imagewise pattern by acoustic beams. In yet another specific embodiment, the printing apparatus employs a piezoelectric ink jet process. Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

Comparative Example A

Diallyl diethyl ammonium bromide monomer was prepared as follows. To 160 grams (2.20 moles) of diethylamine in 100 milliliters of acetone was added 60.5 grams (0.5 mole) of allyl bromide. After several minutes, the solution became cloudy and white crystals of the byproduct diethyl dihydro ammonium bromide were formed in addition to allyl diethyl amine. The solution containing allyl diethyl amine was filtered and distilled under nitrogen at 112° C. to purify the material. Thereafter, the allyl diethyl amine was redissolved in 200 milliliters of acetone and more allyl bromide was slowly added. Crystals of the product, diallyl diethyl ammonium bromide, precipitated out immediately. The product was recovered by filtration, washed with several quantities of acetone, and dried under vacuum.

Poly(diallyl diethyl ammonium bromide) was then prepared as follows. In a 100 milliliter round bottom flask equipped with a reflux condenser was added 23.7 grams (0.1 mole) of diallyl diethyl ammonium bromide monomer dissolved in 12 milliliters of water. Thereafter 4.27 grams (0.033 mole) of the initiator t-butylhydroperoxide (70 weight percent aqueous solution) was added to the flask. The reaction mixture was heated at 60° C. for 48 hours. Thereafter, the viscous solution resulting was diluted with more water and precipitated in a methanol/ether mixture.

The polymer product was recovered as a white powder after vacuum drying. Yield was 85 percent (20.1 gram).

EXAMPLE I

To a 20 gallon reactor containing 15.2 kilograms (208 moles) of diethylamine dissolved in 11.9 kilograms of acetone was added slowly (about 80 grams per minute) 12.6 kilograms (104 moles) of allyl bromide. The clear solution turned cloudy soon after addition of allyl bromide began, indicating formation of the byproduct diethyl dihydro ammonium bromide. After completion of the allyl bromide addition, the contents of the reactor were discharged to a Nutsche filter equipped with a 1 micron Gortex filter. The filtrate containing the intermediate product, allyl diethyl amine, was collected and returned to the reactor. Thereafter, 12.6 kilograms of allyl bromide was again added slowly (about 80 grams per minute) to the reactor. Crystals of diallyl diethyl ammonium bromide monomer precipitated out during the course of the allyl bromide addition and were recovered, after completion of the reaction, by filtration. The diallyl diethyl ammonium bromide monomer was subsequently dried for 24 hours in a vacuum oven. About 15 kilograms of monomer were obtained after drying. Analysis of a sample of the monomer with $^1$H NMR spectroscopy indicated that the monomer was of excellent purity.

Poly(diallyl diethyl ammonium bromide) was then prepared as follows. To a 2 liter Buchi reactor equipped with a glass refluxing condenser was added a solution of 1 kilogram (4.27 moles) of diallyl diethyl ammonium bromide in 0.5 kilogram of water and 0.14 kilogram (1.09 mole) of the initiator t-butylhydroperoxide (70 weight percent aqueous solution). The contents of the reactor were then heated to 100° C. and maintained at that temperature for 7 hours. The vapors were refluxing at the lower part of the glass condenser, indicating that virtually all vapors were captured and returned to the Buchi reactor. After completion of the reaction, 0.5 kilogram of methanol was added to the resulting polymer solution. The polymer product was precipitated by addition of the solution to acetone and then recovered by filtration. Yield of the polymer was about 85 percent. The weight average molecular weight of this polymer was about 3,000, as measured by GPC.

EXAMPLE II

Ink compositions were prepared containing the poly (diallyl diethyl ammonium bromide) prepared in Example I. The ink compositions contained the following ingredients (amounts indicated in percent by weight):

| Ingredient | Cyan Ink | Magenta Ink | Yellow Ink |
|---|---|---|---|
| Acid Blue 9 dye* | 26.09 | — | — |
| ProJet Magenta 3B0A dye** | — | 13 | — |
| ProJet Red OAM dye*** | — | 13 | — |
| ProJet Yellow OAM dye**** | — | — | 45 |
| Sulfolane | 10 | 10 | 5 |
| trimethylol propane | 8 | 8 | — |
| 2,2'-thiodiethanol | — | — | 8 |
| poly(diallyl diethyl ammonium bromide) | 4 | 4 | 4 |
| potassium iodide | 2 | 2.5 | 2 |
| tris(hydroxymethyl) aminomethane | 1.5 | 1.5 | 1.5 |
| butyl carbitol | 0.5 | 0.25 | 0.75 |

-continued

| Ingredient | Cyan Ink | Magenta Ink | Yellow Ink |
|---|---|---|---|
| DOWICIL biocide | 0.05 | 0.05 | 0.05 |
| water | 47.86 | 47.7 | 33.7 |

*9.2 weight percent dye solids in water
**10 weight percent dye solids in water
***10 weight percent dye solids in water
****8.1 weight percent dye solids in water The inks were then incorporated into a Hewlett-Packard 1600C thermal ink jet printer and printed onto the papers indicated in the table below. Waterfastness values for the images were as follows:

| Paper | Cyan Ink | Magenta Ink | Yellow Ink |
|---|---|---|---|
| XEROX ® Image Series LX | 91% | 84% | 83% |
| XEROX ® 4024 | 89% | 86% | 86% |

EXAMPLE III

Diallyl diethyl ammonium bromide monomer was prepared as described in Example I. Poly(diallyl diethyl ammonium bromide) was then prepared as follows. To a 5 gallon reactor equipped with a refluxing condenser having a 0.22 square meter heat transfer area was added a solution of 7.6 kilograms (32.5 moles) of diallyl diethyl ammonium bromide in 3.8 kilograms of water and 2.74 kilograms (21.3 moles) of the initiator t-butylhydroperoxide (70 weight percent aqueous solution). The contents of the reactor were then heated to 100° C. and maintained at that temperature for 7 hours. The section of the pipe above the condenser was only slightly warm to the touch, indicating that most vapors were captured and condensed by the cooling condenser. After completion of the reaction, 3.8 kilograms of methanol were added to the resulting polymer solution. The polymer product was precipitated by addition of the solution to acetone and then recovered by filtration. Yield of the polymer was about 77 percent (5.8 kilograms). The weight average molecular weight of this polymer was about 1,500, as measured by GPC.

EXAMPLE IV

Ink compositions were prepared containing the poly (diallyl diethyl ammonium bromide) prepared in Example III. The ink compositions contained the following ingredients (amounts indicated in percent by weight):

| Ingredient | Black Ink 1 | Black Ink 2 |
|---|---|---|
| ProJet Black OAM dye* | 55.0 | — |
| ProJet Fast Black 2 dye** | — | 21.43 |
| BASF X-34 dye*** | — | 10.54 |
| Sulfolane | 10.0 | 20.0 |
| poly(diallyl diethyl ammonium bromide) | 4.09 | 4.0 |
| potassium iodide | 3.52 | 2.0 |
| tris(hydroxymethyl) aminomethane | 2.0 | 2.0 |
| butyl carbitol | 0.6 | 0.25 |
| DOWICIL biocide | 0.05 | 0.05 |
| water | 24.74 | 39.73 |

*9.0 weight percent dye solids in water
**4.2 weight percent dye solids in water
***33.2 weight percent dye solids in water The inks were then incorporated into a Hewlett-Packard 1600C thermal ink jet printer and printed onto the papers indicated in the table below. Waterfastness values (percent of optical density after immersion in water relative to optical density before immersion in water) for the images were as follows:

| Paper | Black Ink 1 | Black Ink 2 |
|---|---|---|
| XEROX ® Image Series LX | 91.4 | 92.8 |
| XEROX ® 4024 | 93.2 | 95.1 |

EXAMPLE V

To a two liter 3 neck flask equipped with an overhead stirrer, reflux column (exposed to the atmosphere), and a 500 milliliter addition funnel was added 500 milliliters of acetone and 300 grams of diethylamine (4.167 moles). With stirring, 250 grams (2.067 moles) of allyl bromide was slowly added over one hour. After several minutes, the solution became cloudy and white crystals of the byproduct diethyl dihydro ammonium bromide were formed. The reaction was somewhat exothermic, as evident by the refluxing of acetone after approximately 25 percent of the allyl bromide was added to the reaction. The brownish solution containing allyl diethyl amine was filtered to remove the byproduct diethyl dihydro ammonium bromide, and returned to a clean 3 neck 2 liter flask. With stirring 250 grams more of the allyl bromide was then added slowly over a one hour period. (The reaction should be stirred for an additional 1 to 2 hours after addition to ensure the reaction has gone to completion). Crystals of the product, diallyl diethyl ammonium bromide, precipitated out immediately. The product was recovered by filtration and washed with several quantities of acetone (3×100 milliliters) until the brownish color was removed, and dried under vacuum. Theoretical yield, based on the total moles of allyl bromide added (4.134 moles) was 486 grams, actual yield was 242 grams (50 percent). Analysis by $^1$H NMR showed no traces of the byproduct diethyl dihydro ammonium bromide.

Thereafter, 400 grams (1.58 moles) of the diallyl diethyl ammonium bromide monomer was dissolved in 200 grams of distilled deionized water. The resulting solution, together with 72 grams (18 weight percent of monomer) of the initiator t-butylhydroperoxide, was charged into a one liter Buchi equipped with external oil heating unit. The reaction vessel was sealed, the Buchi temperature set at 100° C. for 6 hours, and the reaction mixture was stirred at moderate rpm, and went under approximately 2 psi of pressure. At the completion of the reaction the vessel was cooled and the Buchi discharged to reveal a clear greenish solution. The resulting aqueous solution was diluted 100 percent with methanol (i.e. 200 milliliters of MeOH added to the aqueous solution) and was precipitated into 16 liters of acetone. The white polymer precipitated immediately from the acetone and was recovered by filtration and vacuum dried. The yield of product was 340 grams (85 percent yield) of the poly (diallyl diethyl ammonium) bromide polymer. $^1$H NMR evidenced the complete absence of vinyl protons in the 5 to 6 ppm region indicating that all the vinyl groups had been converted to polymer.

Other embodiments and modifications of the present invention may occur to those of ordinary skill in the art subsequent to a review of the information presented herein; these embodiments and modifications, as well as equivalents thereof, are also included within the scope of this invention. The recited order of processing elements or sequences, or the use of numbers, letters, or other designations therefor, is not intended to limit a claimed process to any order except as specified in the claim itself.

What is claimed is:

1. A process which comprises (a) reacting allyl bromide with diethyl amine in a molar ratio of at least about 1 mole of allyl bromide per about 1.15 moles of diethyl amine and in a molar ratio of no more than about 1 mole of allyl bromide per about 2 moles of diethyl amine, thereby generating allyl diethyl amine in a monomer reaction mixture; (b) subsequently filtering the monomer reaction mixture to remove impurities; (c) subsequently reacting the allyl diethyl amine with allyl bromide, thereby generating solid diallyl diethyl ammonium bromide; (d) subsequently isolating the solid diallyl diethyl ammonium bromide; (e) subsequently dissolving the diallyl diethyl ammonium bromide in a solvent and adding thereto a polymerization initiator to form a polymerization reaction mixture; (f) subsequently heating the polymerization reaction mixture in a vessel equipped with a reflux condenser to a temperature of from about 90 to about 100° C., thereby generating poly(diallyl diethyl ammonium bromide); and (g) subsequently optionally isolating the poly(diallyl diethyl ammonium bromide) from the polymerization reaction mixture.

2. A process according to claim 1 wherein the allyl bromide is reacted with the diethyl amine in a molar ratio of at least about 1 mole of allyl bromide per about 1.19 moles of diethyl amine.

3. A process according to claim 1 wherein the allyl bromide is reacted with the diethyl amine in a molar ratio of about 1 mole of allyl bromide per about 2 moles of diethyl amine.

4. A process according to claim 1 wherein the reaction between the allyl bromide and the diethyl amine takes place at a temperature of no more than about 40° C.

5. A process according to claim 1 wherein the allyl diethyl amine is reacted with the allyl bromide in a molar ratio of at least about 1 mole of allyl bromide per about 0.9 mole of allyl diethyl amine and wherein the allyl diethyl amine is reacted with the allyl bromide in a molar ratio of no more than about 1 mole of allyl bromide per about 1.1 moles of allyl diethyl amine.

6. A process according to claim 1 wherein the allyl diethyl amine is reacted with the allyl bromide in a molar ratio of about 1 mole of allyl bromide per about 1 mole of allyl diethyl amine.

7. A process according to claim 1 wherein the reaction between the allyl bromide and the allyl diethyl amine takes place at a temperature of no more than about 40° C.

8. A process according to claim 1 wherein the solvent in the polymerization reaction mixture is water, acetonitrile, sulfolane, n-methylpyrrolidone, pyridine, derivatives thereof, or mixtures thereof.

9. A process according to claim 1 wherein the polymerization initiator is t-butylhydroperoxide, hydrogen peroxide, ammonium persulfate, or mixtures thereof.

10. A process according to claim 1 wherein the polymerization initiator is present in the polymerization reaction mixture in an amount of from about 5 to about 40 parts by weight of initiator per every 100 parts by weight of diallyl diethyl ammonium bromide.

11. A process according to claim 1 wherein the reflux condenser has a heat transfer area of from about 0.9 to about 1.5 square meters for every kilogram of polymerization initiator.

12. A process which comprises (a) reacting allyl bromide with diethyl amine in a molar ratio of at least about 1 mole of allyl bromide per about 1.15 moles of diethyl amine and in a molar ratio of no more than about 1 mole of allyl bromide per about 2 moles of diethyl amine, thereby generating allyl diethyl amine in a monomer reaction mixture; (b) subsequently filtering the monomer reaction mixture to remove impurities; (c) subsequently reacting the allyl diethyl amine with allyl bromide, thereby generating solid diallyl diethyl ammonium bromide; (d) subsequently isolating the solid diallyl diethyl ammonium bromide; (e) subsequently dissolving the diallyl diethyl ammonium bromide in a solvent and adding thereto a polymerization initiator to form a polymerization reaction mixture; (f) subsequently heating the polymerization reaction mixture in a vessel equipped with a reflux condenser to a temperature of from about 90 to about 100° C., thereby generating poly(diallyl diethyl ammonium bromide); (g) subsequently isolating the poly(diallyl diethyl ammonium bromide) from the polymerization reaction mixture; and (h) admixing the isolated poly(diallyl diethyl ammonium bromide) with additional ingredients comprising water and a colorant, thereby forming an ink composition.

13. A process according to claim 12 wherein the colorant is a pigment.

14. A process according to claim 12 wherein the colorant is a dye.

15. A process according to claim 12 wherein the poly(diallyl diethyl ammonium bromide) is present in the ink composition in an amount of from about 0.5 to about 10 percent by weight of the ink.

16. A process which comprises (a) reacting allyl bromide with diethyl amine in a molar ratio of at least about 1 mole of allyl bromide per about 1.15 moles of diethyl amine and in a molar ratio of no more than about 1 mole of allyl bromide per about 2 moles of diethyl amine, thereby generating allyl diethyl amine in a monomer reaction mixture; (b) subsequently filtering the monomer reaction mixture to remove impurities; (c) subsequently reacting the allyl diethyl amine with allyl bromide, thereby generating solid diallyl diethyl ammonium bromide; (d) subsequently isolating the solid diallyl diethyl ammonium bromide; (e) subsequently dissolving the diallyl diethyl ammonium bromide in a solvent and adding thereto a polymerization initiator to form a polymerization reaction mixture; (f) subsequently heating the polymerization reaction mixture in a vessel equipped with a reflux condenser to a temperature of from about 90 to about 100° C., thereby generating poly(diallyl diethyl ammonium bromide); (g) subsequently isolating the poly(diallyl diethyl ammonium bromide) from the polymerization reaction mixture; (h) admixing the isolated poly(diallyl diethyl ammonium bromide) with additional ingredients comprising water and a colorant, thereby forming an ink composition, (i) incorporating the ink composition thus formed into an ink jet printing apparatus; and (j) causing droplets of the ink composition to be ejected in an imagewise pattern onto a recording substrate.

17. A process according to claim 16 wherein the printing apparatus employs a thermal ink jet process wherein the ink in the nozzles is selectively heated in an imagewise pattern, thereby causing droplets of the ink to be ejected in imagewise pattern.

18. A process according to claim 16 wherein the printing apparatus employs an acoustic ink jet process, wherein droplets of the ink are caused to be ejected in imagewise pattern by acoustic beams.

19. A process according to claim 16 wherein the printing apparatus employs a piezoelectric ink jet process.

20. A process according to claim 16 wherein the recording substrate is paper.

* * * * *